(12) United States Patent
Bulumulla et al.

(10) Patent No.: US 11,017,368 B2
(45) Date of Patent: *May 25, 2021

(54) SYSTEMS AND METHODS FOR AUTOMATICALLY COLLECTION OF PERFORMANCE DATA IN A MULTI-TENANT DATABASE SYSTEM ENVIRONMENT

(71) Applicant: salesforce.com, inc., San Francisco, CA (US)

(72) Inventors: Irandi U. Bulumulla, San Francisco, CA (US); Ryan Guest, Stockton, CA (US)

(73) Assignee: salesforce.com, inc., San Francisco, CA (US)

(*) Notice: Subject to any disclaimer, the term of this patent is extended or adjusted under 35 U.S.C. 154(b) by 74 days.

This patent is subject to a terminal disclaimer.

(21) Appl. No.: 16/449,112

(22) Filed: Jun. 21, 2019

(65) Prior Publication Data

US 2019/0347634 A1    Nov. 14, 2019

Related U.S. Application Data

(63) Continuation of application No. 15/059,792, filed on Mar. 3, 2016, now Pat. No. 10,332,084, which is a
(Continued)

(51) Int. Cl.
*G06Q 20/14* (2012.01)
*G06F 11/34* (2006.01)
(Continued)

(52) U.S. Cl.
CPC ....... *G06Q 20/145* (2013.01); *G06F 11/3476* (2013.01); *G06F 11/3495* (2013.01);
(Continued)

(58) Field of Classification Search
CPC .. G06Q 20/145; G06Q 30/04; G06F 11/3476; G06F 11/3495
(Continued)

(56) References Cited

U.S. PATENT DOCUMENTS

D117,585 S    11/1939 Sperry
D272,963 S    3/1984 Muller et al.
(Continued)

OTHER PUBLICATIONS

USPTO, Non-final Office Action issued in U.S. Appl. No. 12/983,387, dated Dec. 7, 2012.
(Continued)

*Primary Examiner* — Vanel Frenel
(74) *Attorney, Agent, or Firm* — LKGlobal | Lorenz & Kopf, LLP

(57) ABSTRACT

A method of collecting data from multiple sources in a multi-tenant system is provided. The method includes obtaining data corresponding to a first tenant in the multi-tenant system and a second tenant in the multi-tenant system from a first source, obtaining data corresponding to the first tenant in the multi-tenant system and the second tenant in the multi-tenant system from a second source, and aggregating the data obtained from the first and second sources into a single database and associating each entry of the obtained data with at least one of the tenants of the multi-tenant system.

12 Claims, 3 Drawing Sheets

Figure 1:
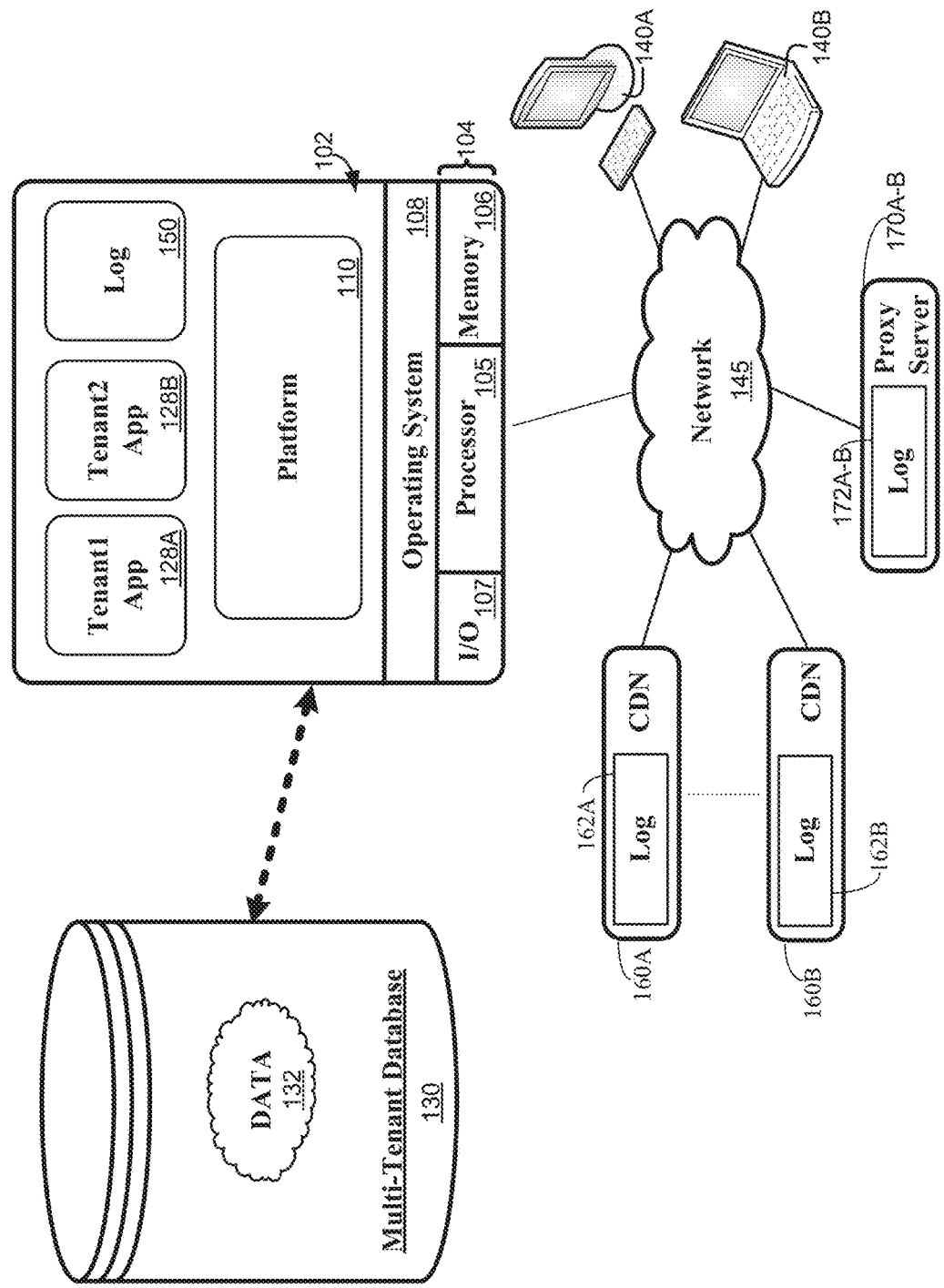

Related U.S. Application Data continuation of application No. 12/983,387, filed on Jan. 3, 2011, now Pat. No. 9,311,664.

(60) Provisional application No. 61/348,204, filed on May 25, 2010.

(51) Int. Cl.

| | | |
|---|---|---|
| *G06Q 30/04* | (2012.01) | |
| *G06Q 30/06* | (2012.01) | |
| *H04L 12/911* | (2013.01) | |
| *H04L 29/08* | (2006.01) | |
| *G06Q 20/10* | (2012.01) | |
| *G06Q 40/00* | (2012.01) | |
| *G06Q 40/02* | (2012.01) | |
| *G06Q 50/18* | (2012.01) | |
| *G06Q 40/04* | (2012.01) | |
| *G06Q 10/10* | (2012.01) | |
| *H04L 12/24* | (2006.01) | |

(52) U.S. Cl.
CPC ............ *G06Q 30/04* (2013.01); *G06Q 30/06* (2013.01); *H04L 47/70* (2013.01); *H04L 67/1097* (2013.01); *H04L 67/28* (2013.01); *G06F 11/3409* (2013.01); *G06F 11/3438* (2013.01); *G06Q 10/10* (2013.01); *G06Q 20/102* (2013.01); *G06Q 40/00* (2013.01); *G06Q 40/02* (2013.01); *G06Q 40/04* (2013.01); *G06Q 40/10* (2013.01); *G06Q 50/188* (2013.01); *H04L 41/0604* (2013.01)

(58) Field of Classification Search
USPC ......................................................... 705/305
See application file for complete search history.

(56) References Cited

U.S. PATENT DOCUMENTS

| | | |
|---|---|---|
| 4,577,977 A | 3/1986 | Pejsa |
| D322,881 S | 1/1992 | Bushman |
| D324,448 S | 3/1992 | Blissett |
| D329,131 S | 9/1992 | Ostberg |
| 5,577,188 A | 11/1996 | Zhu |
| D378,471 S | 3/1997 | Winson |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,016,307 A | 1/2000 | Kaplan et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| D450,178 S | 11/2001 | Boncutter |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| D455,895 S | 4/2002 | Yang |
| 6,367,077 B1 | 4/2002 | Brodersen et al. |
| 6,378,073 B1 | 4/2002 | Davis et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,546,392 B1 | 4/2003 | Bahlmann |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,747,968 B1 | 6/2004 | Seppala et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,832,250 B1 | 12/2004 | Coons et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| D529,697 S | 10/2006 | Earle |
| 7,181,758 B1 | 2/2007 | Chan |
| D540,514 S | 4/2007 | Hendricks |
| D540,516 S | 4/2007 | Weitzman |
| D547,035 S | 7/2007 | Belley et al. |
| 7,281,343 B2 | 10/2007 | Riha et al. |
| 7,289,976 B2 | 10/2007 | Kihneman et al. |
| D558,958 S | 1/2008 | Motomura |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| D577,180 S | 9/2008 | Della Valle |
| D577,181 S | 9/2008 | Della Valle |
| D580,638 S | 11/2008 | McClaskie |
| 7,508,789 B2 | 3/2009 | Chan |
| D593,741 S | 6/2009 | Vico et al. |
| D596,385 S | 7/2009 | McDade et al. |
| D604,482 S | 11/2009 | Fletcher |
| 7,620,655 B2 | 11/2009 | Larsson et al. |
| 7,698,160 B2 | 4/2010 | Beaven et al. |
| 7,779,475 B2 | 8/2010 | Jakobson et al. |
| D626,312 S | 11/2010 | Della Valle et al. |
| D628,365 S | 12/2010 | Bourdin et al. |
| D634,519 S | 3/2011 | Choi |
| D636,155 S | 4/2011 | Della Valle et al. |
| D640,046 S | 6/2011 | Claassen |
| D641,145 S | 7/2011 | Della Valle et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| D651,387 S | 1/2012 | Van Zyll De Jong et al. |
| D651,388 S | 1/2012 | Van Zyll De Jong et al. |
| D651,389 S | 1/2012 | Van Zyll De Jong et al. |

(56) References Cited

U.S. PATENT DOCUMENTS

| | | |
|---|---|---|
| D651,390 S | 1/2012 | Van Zyll De Jong et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,209,308 B2 | 10/2012 | Rueben et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0010601 A1 | 1/2002 | Taylor |
| 2002/0016776 A1 | 2/2002 | Chu et al. |
| 2002/0033416 A1 | 3/2002 | Gerszberg et al. |
| 2002/0052765 A1 | 5/2002 | Taylor |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120502 A1 | 6/2003 | Robb et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0210909 A1 | 10/2004 | Dominguez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0060914 A1 | 3/2005 | Fuerst |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2006/0235831 A1 | 10/2006 | Adinolfi et al. |
| 2008/0249972 A1 | 10/2008 | Dillon |
| 2008/0263905 A1 | 10/2008 | Tai |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0228650 A1 | 9/2010 | Shacham et al. |
| 2010/0281714 A1 | 11/2010 | Carboy et al. |
| 2010/0325245 A1 | 12/2010 | Sibillo |
| 2011/0213687 A1 | 9/2011 | Ferris et al. |
| 2011/0247051 A1 | 10/2011 | Bulumulla et al. |
| 2011/0276951 A1 | 11/2011 | Jain |
| 2012/0042218 A1 | 2/2012 | Cinarkaya et al. |
| 2012/0218958 A1 | 9/2012 | Warshavsky et al. |
| 2012/0233137 A1 | 9/2012 | Jakobson et al. |
| 2012/0311153 A1 | 12/2012 | Morgan |
| 2013/0103520 A1 | 4/2013 | Lyon |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0346899 A1 | 12/2013 | Cole et al. |
| 2015/0229586 A1 | 8/2015 | Jackson |

OTHER PUBLICATIONS

Response to non-final Office Action for U.S. Appl. No. 12/983,387, dated Mar. 27, 2013.
USPTO, Final Office Action issued in U.S. Appl. No. 12/983,387, dated Apr. 12, 2013.
Response to Final Office Action for U.S. Appl. No. 12/983,387, dated Jul. 10, 2013.
USPTO, Non-final Office Action issued in U.S. Appl. No. 12/983,387, dated Aug. 17, 2015.
Response to non-final Office Action for U.S. Appl. No. 12/983,387, dated Nov. 12, 2015.
USPTO, Notice of Allowance issued in U.S. Appl. No. 12/983,387, dated Dec. 3, 2015.

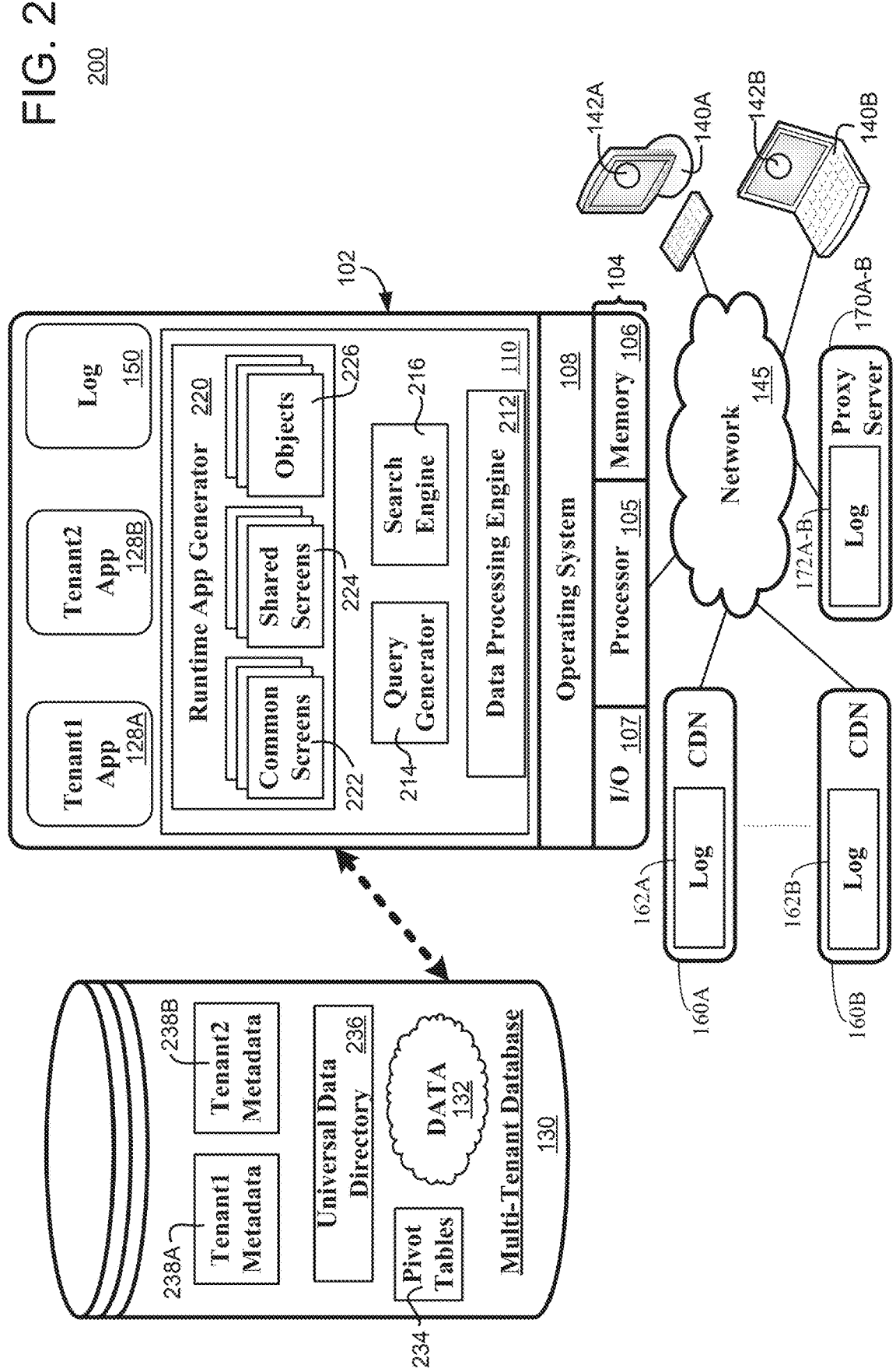

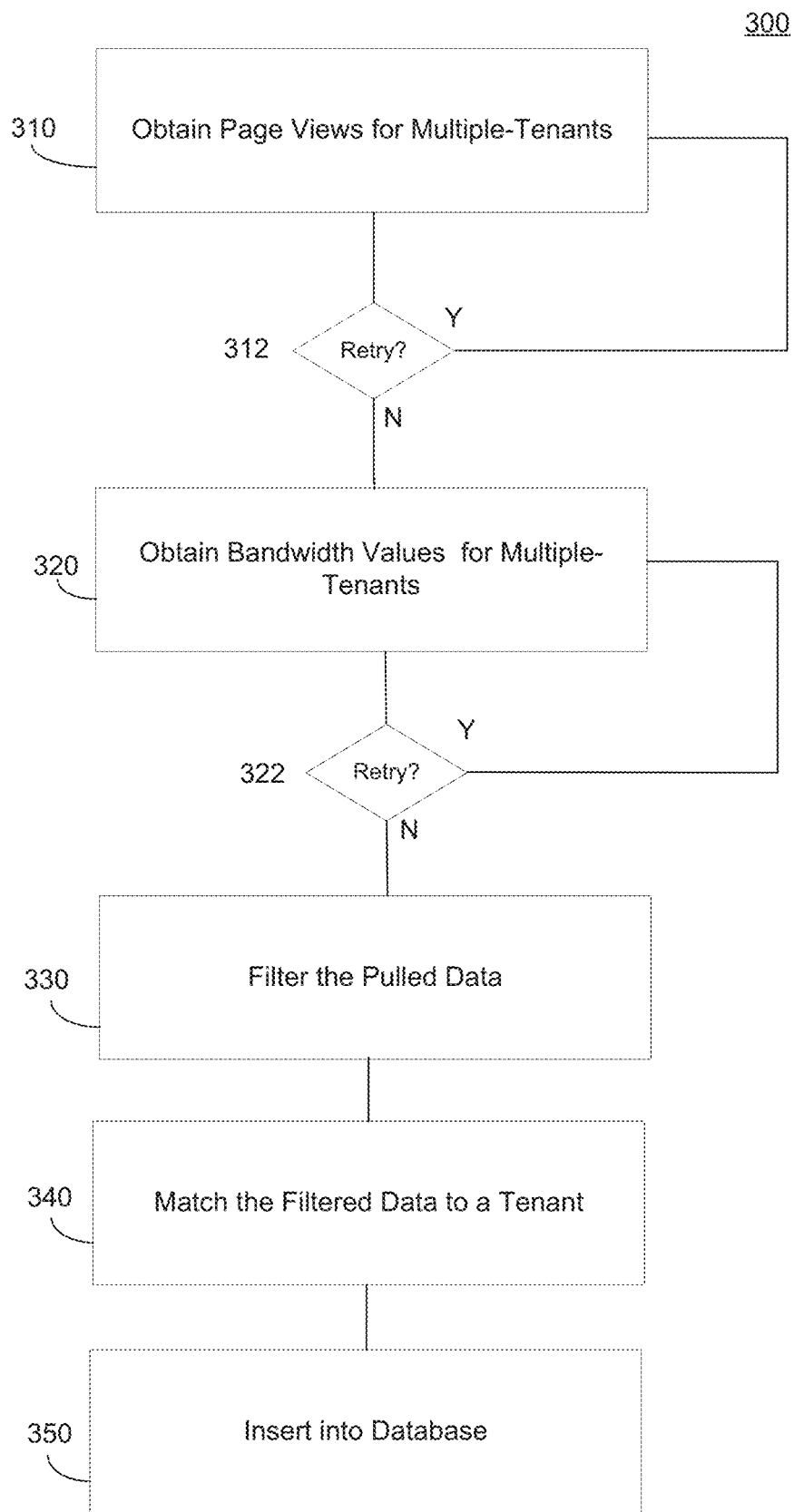

SYSTEMS AND METHODS FOR AUTOMATICALLY COLLECTION OF PERFORMANCE DATA IN A MULTI-TENANT DATABASE SYSTEM ENVIRONMENT

CROSS-REFERENCE TO RELATED APPLICATIONS

This application is a continuation of U.S. patent application Ser. No. 15/059,792, filed on Mar. 3, 2016 and issued on Jun. 25, 2019 as U.S. Pat. No. 10,332,084; which is a continuation of U.S. patent application Ser. No. 12/983,387, filed on Jan. 3, 2011 and issued on Apr. 12, 2016 as U.S. Pat. No. 9,311,664; which claims the benefit of U.S. provisional patent application Ser. No. 61/348,204, filed May 25, 2010.

TECHNICAL FIELD

The following relates to data processing systems and processes, and more particularly relates to systems and processes for collecting performance data for multiple tenants in a multi-tenant database system environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. Furthermore, because the multiple tenants are sharing the same infrastructure, it can be difficult to determine usage and performance data for each tenant. For example, it may be desirable to monitor user the usage and performance data to accurately bill each tenant for the amount of infrastructure resources actually used.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant data processing system;

FIG. 2 is a block diagram of another exemplary multi-tenant data processing system; and FIG. 3 is a flow chart illustrating an exemplary method of collecting performance data in a multi-tenant data processing system.

DETAILED DESCRIPTION

According to various exemplary embodiments, systems and methods are provided to automatically collect usage and performance data for each tenant in a multi-tenant database system environment.

Turning now to FIG. 1, an exemplary multi-tenant application system 100 suitably includes a server 102 that dynamically creates virtual applications 128A-B based upon data 132 from a common database 130 that is shared between multiple tenants. The server 102 may be referred to as, for example, an origin application server. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. The multi-tenant application system 100 may also include any number of content delivery networks ("CDNs") 160A-B, as desired. The CDNs 160A-B may contain a copy of at least some of the data 132 which may be accessible via the network 145 as described in further detail below. The multi-tenant application system 100 may also employ any number of proxy servers 170A-B which may be used to direct traffic between the server 102 and the CDNs 160A-B.

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants, as described more fully below. The multi-tenant architecture therefore allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

When the data and services generated by the virtual applications 128A-B are provided via network 145 to the any number of client devices 140A-B a log of each event is stored in Log 150. As discussed above, some of the data 132 stored in the database 130 may also be stored in any number of CDNs 160A-B. CDNs are usually deployed in multiple locations, often over multiple backbones. These CDNs 160A-B cooperate with each other, the server 102 and any proxy servers 17A-B to satisfy requests for content by end users of client devices 140A-B, transparently moving content to optimize the delivery process. Optimization can take the form of reducing bandwidth costs, improving end-user performance (reducing page load times and improving user experience), or increasing global availability of content. Similar to the log 150 in server 102, the CDNs 160A-B each have a log 162A-B storing a log of each event. Each proxy server 172A-B may also have a log for storing events.

The logs (log 150, 162A-B and 172A-B) may record when an action occurs. For example, an entry may be added to a logs whenever a page is viewed or bandwidth is used on the respective server. The logs may also increment a counter associated with a page whenever the page is viewed. A tier may also be associated with each action by the respective server. The tier associated with the page view will often depend upon the content on the page. Any number of tiers can be associated with the page views. The logs may also store a bandwidth consumed by each page view and and/or a request time associated with each page request. In another embodiment, the logs 150, 162A-B and 172A-B may store a request time, the time the respective server within the multi-tenant application system 100 takes to serve a customer request.

The server 102 collects performance data from logs 150, 162A-b and/or 172A-B and aggregates the data into a single database as described in further detail below. In another embodiment, a separate billing server (not illustrated) may collect the performance data from server 102, the CDNs 160A-B and any proxy servers 170A-B. In one embodiment, for example, the proxy servers 170A-B may be reverse proxy servers.

FIG. 2 illustrates another exemplary multi-tenant application system 200 in accordance with an embodiment. The multi-tenant application system 200 includes client devices 140A-B, network 145, CDNs 160A-B and proxy servers 170A-B similar to those described above. The multi-tenant application system 200 further includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 128A-B to logically obtain, process, and present the relatively amorphous data 132 from database 130.

Application platform 110 is any sort of software application or other data processing engine that generates virtual applications 128A-B that provide data and/or services to client devices 140A-B. Virtual applications 128A-B are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 128A-B in response to specific requests received from client devices 140A-B. Virtual applications 128A-B created by tenants are typically constructed in accordance with tenant-specific metadata 238, which describes the particular tables, reports, interfaces and/or other features of the particular application. In various embodiments, each virtual application 128A-B generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 128A-B and/or the like. Again, the various components, modules and inter-relationships of other application platforms 120 may vary from the particular examples described herein.

In operation, then, developers use application platform 110 to create data-driven virtual applications 128A-B for the tenants that they support. Such applications 128A-B may make use of interface features such as tenant-specific screens 224, universal screens 222 or the like. Any number of tenant-specific and/or universal objects 226 may also be available for integration into tenant-developed applications 128A-B. Data 132 associated with each application 128A-B is provided to database 130, as appropriate, and stored until requested, along with metadata 138 that describes the particular features (e.g., reports, tables, functions, etc.) of tenant-specific application 128A-B until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SessionID") that identifies the user in subsequent communications with server 102. When the identified user requests access to a virtual application 128A-B, application generator 220 suitably creates the application at run time based upon metadata 236 and 238, as appropriate. Query generator 214 suitably obtains the requested data 132 from database 130 as needed to populate the tables, reports or other features of virtual application 128A-B. As noted above, the virtual application 128A-B may contain Java, ActiveX or other content that can be presented using conventional client software 142A-B running on client device 140A-B; other embodiments may simply provide dynamic web or other content that can be presented and viewed by the user, as desired.

Whenever a request is received by a server connected to the multi-tenant application system 200 (i.e., server 102, CND 160A-B, proxy server 170A-B, etc.), the respective server creates a log entry in a respective log. The servers within the multi-tenant application system 200 may log page views, bandwidth usage, request time and any other usage or performance data as needed.

FIG. 3 illustrates a method 300 for collecting performance data in accordance with an embodiment. The server 102 obtains the page views from each log (e.g. logs 150, 162A-B, 172, etc.). (Step 310). The server 102 may obtain the page views at any time and at any frequency. In one embodiment, for example, the server 102 may obtain the page views at a predetermined time each day. The server 102 may obtain the page views once per day, multiple times per day, once per week, multiple times per week, once per month and/or multiple times each month. The server 102 may then obtain the bandwidth values stored in each log (e.g. logs 150, 162A-B, 172, etc.). (Step 320). The server 102 may obtain the bandwidth values simultaneously with the pages views or at a separate time (before or after). The bandwidth values may be obtained at the same frequency as the page views or at a different frequency. In one embodiment, for example, the bandwidth values may be obtained one hour after the server 102 obtains the page views.

The server 102 may obtain the page views and bandwidth values for any predetermined period of time. In one embodiment, for example, the frequency at which the page views and bandwidth values are obtained may differ from the period of time the page views and bandwidth values are obtained. For example, in one embodiment the server 102 may obtain page view and bandwidth values once a day, each time obtaining the data, for example, for the past two days or three days. By obtaining the same data multiple times over different days, the server 102 may verify that the data is correct and that there have been no changes, as discussed in further detail below.

If the server 102 fails to obtain the data from any one of the servers (CDNs, proxy servers, etc.) at steps 310 or 320, the server 102 can try to re-obtain the data. (Steps 312 and 322). The server 102 may try to re-obtain the data immediately after the failed attempt, or at a subsequent time. In one embodiment, if the server 102 fails to obtain data from one of the CDNs, for example, the server 102 may increase the amount of data captured on a subsequent obtain. For example, if the server 102 failed in an attempt to obtain the past two days values for page views, the server 102 in the subsequent obtain may attempt to obtain the past three days values for page views.

If the logs are recording events which the server 102 is uninterested in, the server 102 may filter the page views and bandwidth data obtained from the logs. (Step 330). For example, for billing purposes the server 102 may not be interested in static content (e.g., images, JavaScript, css files) or AJAX requests. In another embodiment, for example, the server 102 may also filter out test data. If the server is monitoring performance, other types of page views may be filtered. Furthermore, the filtering may be done on a tenant-by-tenant fashion. For example, certain events may be filtered for one tenant based upon filtering settings associated with that tenant, but the event may not be filtered for another tenant. The filtering can be performed by any known manner. For example, in one embodiment the server 102 may perform the filtering by analyzing a uniform resource locator ("URL") associated with each page view and bandwidth value. In another embodiment only the page views may be filtered. The server 102 may, for example, parse a URL associated with a page view to determine a type associated with the page view. The server 102, at step 330, may also associate a tier with each page view based upon the type associated with each page view. In one embodiment, for example, a page which is associated with media content my have a higher tier than a page which is associated with plain text. The tiers, for example, may be billed at different rates, or may be used to partition the data into different performance categories.

In another embodiment an identification code identifying a content type may be stored with each entry in the logs (e.g. logs 150, 162A-B, 172, etc.). The server may obtain the identification code and filter the obtained information based upon the identification code. In yet another embodiment the server 102 may only obtain logged events with a predefined set of identification codes.

The server 102 may then determine which tenant is associated with each entry in the logs. (Step 340). In one embodiment, for example, the server 102 may determine which tenant is associated with each log entry by parsing a URL associated with the log entry. In one embodiment, for example, the server 102 may aggregate all of the page view data and bandwidth value data into a single database, while tagging each of the entries to indicate which tenant the entry belongs to. In another embodiment, for example, the server may generate a separate database for each tenant including all of the page views and bandwidth values related to the tenant. In yet another embodiment, the server may generate both an aggregate database with all of the data and an individual database for each tenant with all of the data relating to the tenant.

As discussed above, the same data may be obtained multiple times depending by the frequency at which the data is obtained and the length of time over which the data is obtained. If the data for an entry in the aggregate and/or individual databases has been previously obtained, the server 102 at step 340 may also compare the previously obtained data to the currently stored data. In one embodiment, for example, if the new data differs from the previously stored data, the server 102 overwrites the old data entry with the new data entry. In another embodiment, the data from each obtain may be saved for later analysis. For example, if the data is being used to generate a bill for a tenant based upon the usage of the multi-tenant system 100 (e.g., based upon the number of page views and/or bandwidth usage), all of the accumulated data may be saved and then analyzed prior to a bill generation. One benefit, for example, of obtaining the same data multiple times is that each server which is logging the data may have a different logging system, a logging system may be temporarily backed up, or a logging system may lag being in page view aggregations. Accordingly, by obtaining the same data multiple times, a more accurate set of performance data for each tenant on the multiple servers may be created.

The server 102 may then store the aggregate and/or individual databases in a memory. (Step 350). The aggregate and/or individual databases may be stored in memory 106, in database 130 or in any other memory in communication with the server 102. In one embodiment, for example, the aggregate and/or individual databases may be accessible by each tenant such that the tenant can view its own performance data or usage data. In another embodiment, once the data is collected, the data may be exposable to another tenant that runs a billing system. As discussed above, the page view data and bandwidth value data may be used to generate a usage bill for each tenant in the multi-tenant system 100. The collected data may be used, for example, for tiered billing. In one embodiment, for example, the billing system may associate one price with bandwidth usage and another price for page views.

Generally speaking, the various functions and features of method 300 may be carried out with any sort of hardware, software and/or firmware logic that is stored and/or executed on any platform. Some or all of method 300 may be carried out, for example, by logic executing within system 100 in FIG. 1. For example, various functions shown in FIG. 3 may be implemented using software or firmware logic that is stored in memory 106 and executed by processor 105 as part of application platform 110. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method of collecting data from multiple sources in a cloud services system, comprising:
    obtaining usage-based data corresponding to usage of services of the cloud services system by two or more consumers of resources of the cloud services system;
    summarizing the obtained usage-based data corresponding to usage of the services of the cloud services system and associating each entry of the summarized obtained usage-based data with at least one of the two or more consumers based upon a uniform resource locator associated with each entry of the summarized obtained usage-based data;
    associating a pricing tier with each entry of the summarized obtained usage-based data based upon a type associated with each entry of the summarized obtained usage-based data, wherein the type is determined based upon the uniform resource locator associated with each entry of the summarized obtained usage-based data;
    generating a bill corresponding to at least one of the two or more consumers, based upon the summarized obtained usage-based data associated with the respective consumer's usage of the services of the cloud services system and based upon the pricing tier associated with the respective entry of the summarized obtained usage-based data; and
    generating a viewable or presentable billing report for the generated bill, the billing report including the summarized obtained usage-based data associated with the respective consumer's usage of the services of the cloud services system.

2. The method of claim 1, further comprising filtering the summarized obtained usage-based data based upon the type associated with the data.

3. The method of claim 1, wherein the services of the cloud services system include a first virtual application and a second virtual application.

4. The method of claim 1, further comprising aggregating the obtained usage-based data into a separate database associated with a respective one of the two or more consumers of resources of the cloud services system.

5. The method of claim 1, wherein the summarized obtained usage-based data includes page view data and bandwidth value data.

6. A non-transitory computer readable medium storing instructions, which when executed by a processor, cause the processor to perform a method comprising the steps of:
    obtaining usage-based data corresponding to usage of services of the cloud services system by two or more consumers of resources of the cloud services system;
    summarizing the obtained usage-based data corresponding to usage of the services of the cloud services system and associating each entry of the summarized obtained usage-based data with at least one of the two or more consumers based upon a uniform resource locator associated with each entry of the summarized obtained usage-based data;

associating a pricing tier with each entry of the summarized obtained usage-based data based upon a type associated with each entry of the summarized obtained usage-based data, wherein the type is determined based upon the uniform resource locator associated with each entry of the summarized obtained usage-based data;

generating a bill corresponding to at least one of the two or more consumers, based upon the summarized obtained usage-based data associated with the respective consumer's usage of the services of the cloud services system and based upon the pricing tier associated with the respective entry of the summarized obtained usage-based data; and generating a viewable or presentable billing report for the generated bill, the billing report including the summarized obtained usage-based data associated with the respective consumer's usage of the services of the cloud services system.

7. The non-transitory computer readable medium of claim 6, wherein the services of the cloud services system include a first virtual application and a second virtual application.

8. The non-transitory computer readable medium of claim 6, the instructions further causing the processor to filter the summarized obtained usage-based data based upon the type associated with the data.

9. The non-transitory computer readable medium of claim 6, wherein the instructions further cause the processor to aggregate the obtained usage-based data into a separate database associated with a respective one of the two or more consumers of resources of the cloud services system.

10. A system for collecting performance data in a cloud computing system, comprising:
a memory; and
a server communicatively connected to the memory and communicatively connected to resources of the cloud computing system, the server configured to:

obtain usage-based data corresponding to usage of services of the cloud services system by two or more consumers of resources of the cloud services system;

summarize the obtained usage-based data corresponding to usage of the services of the cloud services system and associating each entry of the summarized obtained usage-based data with at least one of the two or more consumers based upon a uniform resource locator associated with each entry of the summarized obtained usage-based data;

associate a pricing tier with each entry of the summarized obtained usage-based data based upon a type associated with each entry of the summarized obtained usage-based data, wherein the type is determined based upon the uniform resource locator associated with each entry of the summarized obtained usage-based data;

generate a bill corresponding to at least one of the two or more consumers, based upon the summarized obtained usage-based data associated with the respective consumer's usage of the services of the cloud services system and based upon the pricing tier associated with the respective entry of the summarized obtained usage-based data; and generate a viewable or presentable billing report for the generated bill, the billing report including the summarized obtained usage-based data associated with the respective consumer's usage of the services of the cloud services system.

11. The system of claim 10, wherein the services of the cloud services system include a first virtual application and a second virtual application.

12. The system of claim 10, wherein the server is further configured to filter the summarized obtained usage-based data based upon the type associated with the data.

* * * * *